Nov. 28, 1933.  H. RIEPERT  1,937,206
THERMOMICROSCOPIC ARRANGEMENT
Filed June 22, 1932  2 Sheets-Sheet 1
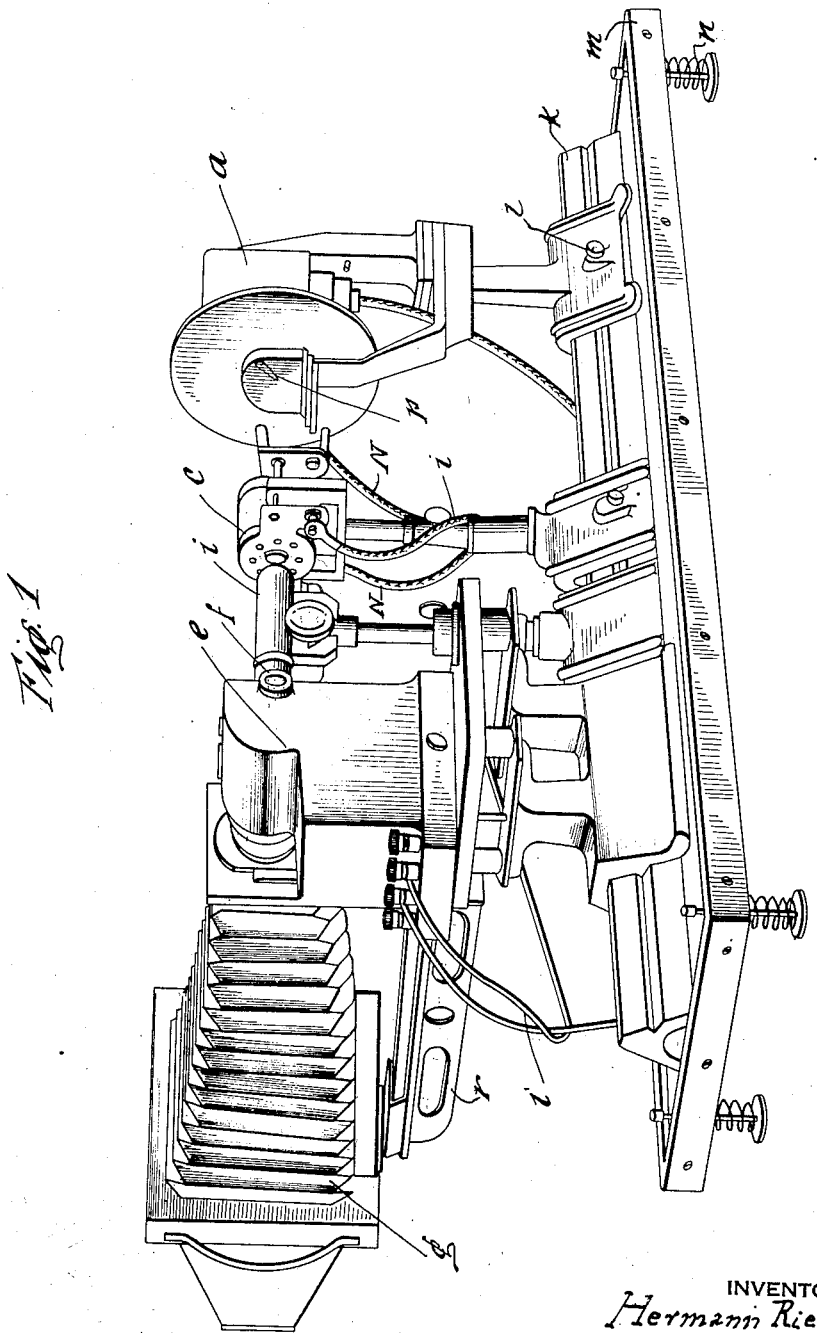
INVENTOR
Hermann Riepert
BY
George C Heinrichs
ATTORNEY

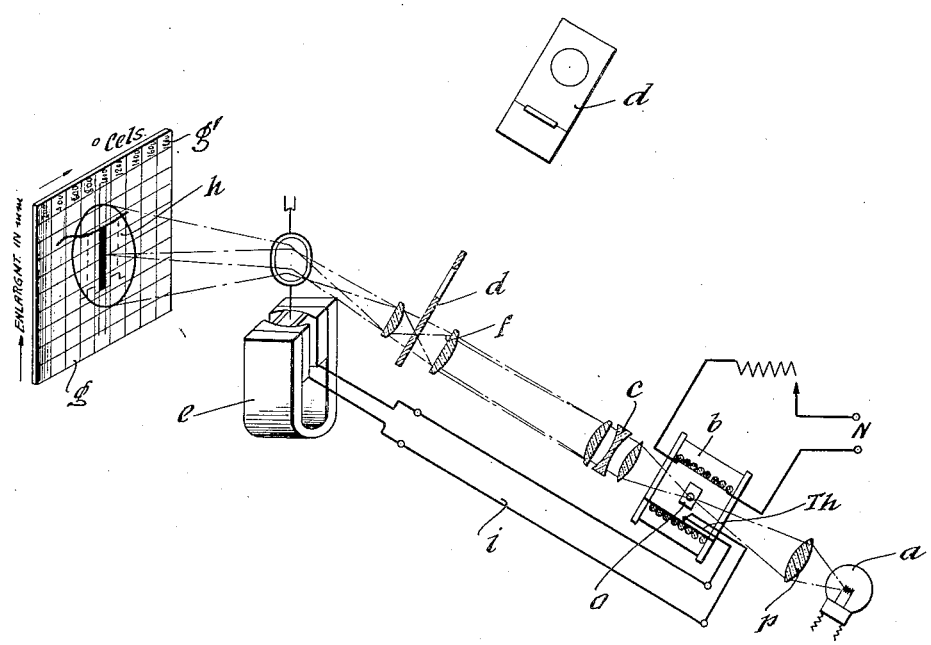

Patented Nov. 28, 1933

1,937,206

UNITED STATES PATENT OFFICE 1,937,206

THERMOMICROSCOPIC ARRANGEMENT

Hermann Riepert, Wetzlar, Germany, assignor to the firm: Ernst Leitz, Optische Werke, Wetzlar, Germany Application June 22, 1932, Serial No. 618,680, and in Germany July 20, 1931

3 Claims. (Cl. 73—32)

This invention relates to a thermo-microscope for the photographic registry of the refractory and fusibility reactions of a melting body, and it is the principal object of my invention to provide a thermo-microscope which is combined with a mirror galvanometer, and illuminating source, and an electric furnace and is used for the photographic registry of the refractory and fusing phenomena of a melting body together with the temperatures at which they occur.

Another object of my invention is the provision of a thermo-microscope for the photomicrographic projection of a melting body by the intermediary of a slitted diaphragm or circular diaphragm inserted into the ocular of a microscope and in front of a galvanometer mirror.

A further object of my invention is the provision of a thermo-microscope in which a calibrated scale sheet is arranged in front of a photographic plate, while the arrangement of a frosted or colored plate behind the photographic plate permits the observation of the reactions and phenomena during the process of melting of a body and for reading the prevailing temperatures on the scale sheet.

A still further object of my invention is the provision of a thermo-microscope in which interchangeable, slitted and circular diaphragms are arranged in the ocular of the microscope in order to allow the sharp focusing of thermo-couple and melting body with the large field revealed by the circular diaphragm and the subsequent photographic registry with the narrow field revealed by the slotted diaphragm.

These and other objects and advantages of my invention will become more fully known as the description thereof proceeds, and will then be specifically defined in the appended claims.

In the accompanying drawings forming a material part of this disclosure:

Fig. 1 is a perspective view of a thermo-microscope constructed according to my invention.

Fig. 2 is a diagrammatic view of the same.

Fig. 3 is a detail view of a diaphragm slider.

As illustrated, in front of a source of light $a$, an illuminating lens $p$ is arranged, and between the same and a microscope $c$, $f$, and electric furnace $b$ with a melting body $o$, and a thermo-couple $Th$ are provided. The furnace is located within an electric circuit $N$, while the thermostatic couple is connected by means of conductors $i$ with a mirror galvanometer $e$. The ocular of the microscope has interchangeably interposed therein a slider $d$ having a slit which may be substituted by a circular aperture if so desired or required.

In front of the photographic plate holder and sheet $g$, a transparent or translucent plate can be arranged which carries a system of coordinates designated $g'$, and the field of view revealing the melting body under observation on said sheet is designated $h$.

In operation the entire apparatus is mounted on a triangular rail $k$ and secured thereto by means of the clamp screws $l$. It rests upon a table or other suitable support $m$ supported by the springs $n$ to avoid disturbances by shocks etc.

The source of light is preferably a lamp of low voltage allowing a regulation for any desired degree of brightness. The electric furnace is adjustable to allow the insertion of the body to be melted, and allows the regulation of the temperatures according to requirement. The microscope is adjustable in the direction of its horizontal axis by the operation of the screw $q$ and the objective forms an image of the melting body in the furnace. The fusing point of the thermo-couple must be in the same plane as the melting body and will also appear in the projected image. The slit in the slider allows the projection of a small portion of the image. The bellows camera and the mirror galvanometer are arranged upon a common supporting bracket $r$ and the image projected through the slit is adjusted by means of a set screw to appear on the calibrated scale of the sheet in the plate holder at the zero points of the coordinate system. The wires of the thermo-couple are attached to the pole screws of the galvanometer. The plate holder contains the light sensitive sheet covered at its front by the calibrated and graduated frosted plate carrying the net of coordinates; the photograph will therefore show the net of this frosted plate simultaneously with the melting curve.

The mirror of the galvanometer turns corresponding to the temperature developed in the furnace and the picture projected through the slit will appear at the proper place on the frosted plate. In this manner the timely height of the body during the progress of its melting (ordinates) depending upon the temperature prevailing (abscissa) will appear in the picture, as the projection of the melting body through the microscope is deflected by the galvanometer, so that the height of the melting body is projected on the sheet with the temperature measurement and as the temperature measurement moves to the right with increased temperature, the height of the melting body decreases.

It is possible to observe the progressing process by using a red glass plate behind the light sensitive sheet and a light-proof box attachment, and to simultaneously read the temperature of the furnace on the scale of the frosted plate so that the application of a special thermometer is not necessary.

It will be understood that I have described and shown the preferred form of my apparatus only as one example of the many possible ways to practically construct the same, and that I may make such changes in its general arrangement and in the construction of its minor details as come within the scope of the appended claims without departure from the spirit of my invention and the principles involved.

Having thus described my invention, what I claim as new and desire to secure by Letters Patent is:

1. A thermo-microscope comprising a source of light and an illuminating lens, a microscope, an electric furnace containing a fusing body arranged between said lens and the microscope, a thermo-couple, a slitted diaphragm interchangeably interposed in the ocular of the microscope, a mirror galvanometer connected to said thermo-couple, and a sensitive sheet upon which the image of the fusing body is projected by the intermediary of said diaphragm and the mirror galvanometer.

2. A thermo-microscope comprising a plate holder, a sensitized sheet in said holder and a calibrated and graduated plate in front of said sheet, and means for projecting the picture of the melting body upon said sheet for the reading of the prevailing temperatures on the scale, said means comprising a microscope, an illuminating lens, an electric furnace for melting a body between said lens and the microscope, a thermo-couple, a mirror galvanometer connected with said thermo-couple, a slider within the ocular of the microscope.

3. In a thermo-microscope of the class described, a regulable lamp of low voltage and an illuminating lens, a microscope adjustable in the direction of its horizontal axis, an electric furnace between said lamp and lens and the microscope, a camera the objective of which forms an image of the body melting in said furnace, a thermo-couple having its fusing point in the same plane as the melting body, a slotted slider interchangeably interposed in the ocular of the microscope, a mirrored galvanometer connected to said thermo-couple and turning corresponding to the temperature developed in the furnace, a common base for the camera and said galvanometer, a plate held in said camera, containing the light sensitive sheet, and a calibrated and graduated frosted plate covering the front of said sensitive sheet and carrying a net of coordinates.

HERMANN RIEPERT.